(12) United States Patent
Kim et al.

(10) Patent No.: US 10,441,892 B2
(45) Date of Patent: Oct. 15, 2019

(54) PSEUDO-SENTIENT DOLL OVERRIDE SYSTEM, METHOD, AND RECORDING MEDIUM FOR PSEUDO-SENTIENT DOLL OVERRIDE

(71) Applicant: International Business Machines Corporation, Armonk, NY (US)

(72) Inventors: Minkyong Kim, Scarsdale, NY (US); Clifford A. Pickover, Yorktown Heights, NY (US); Valentina Salapura, Chappaqua, NY (US); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 346 days.

(21) Appl. No.: 15/222,837

(22) Filed: Jul. 28, 2016

(65) Prior Publication Data
US 2018/0028926 A1 Feb. 1, 2018

(51) Int. Cl.
*G06N 3/00* (2006.01)
*A63H 3/28* (2006.01)
*A63H 3/00* (2006.01)

(52) U.S. Cl.
CPC .............. *A63H 3/003* (2013.01); *A63H 3/28* (2013.01); *G06N 3/008* (2013.01); *A63H 2200/00* (2013.01)

(58) Field of Classification Search
CPC .... A63H 2200/00; G06N 3/008; G09B 19/00; G09B 5/00
See application file for complete search history.

(56) References Cited

U.S. PATENT DOCUMENTS

| | | | | |
|---|---|---|---|---|
| 2004/0133311 A1* | 7/2004 | Park | ............ | A63H 3/46 700/245 |
| 2008/0139080 A1* | 6/2008 | Zheng | ............ | A63H 3/28 446/268 |
| 2014/0273717 A1* | 9/2014 | Judkins | ............ | A63H 3/28 446/175 |
| 2016/0078366 A1* | 3/2016 | Kaplan | ............ | G06N 3/008 706/12 |

OTHER PUBLICATIONS

Mel, et al. "The NIST Definition of Cloud Computing". Recommendations of the National Institute of Standards and Technology. Nov. 16, 2015.

* cited by examiner

*Primary Examiner* — Jerry-Daryl Fletcher
(74) *Attorney, Agent, or Firm* — Anthony Curro, Esq.; McGinn IP Law Group, PLLC (57) ABSTRACT

A pseudo-sentient doll override method, system, and non-transitory computer readable medium for a doll, include an interaction level determining circuit configured to determine an interaction level between a user and the doll and a reminder triggering circuit configured to trigger a reminder to the user that the doll is not sentient based on the interaction level associated with a set of rules.

19 Claims, 5 Drawing Sheets

PSEUDO-SENTIENT DOLL OVERRIDE 200

PSEUDO-SENTIENT DOLL OVERRIDE SYSTEM, METHOD, AND RECORDING MEDIUM FOR PSEUDO-SENTIENT DOLL OVERRIDE

BACKGROUND

The present invention relates generally to a pseudo-sentient doll override system and more particularly, but not by way of limitation, to a system for overriding an operation of a doll for the doll to leave (temporarily) the doll's lifelike mode to remind a user that the doll is not "really" a living entity.

Dolls are becoming more lifelike, smart, and interactive. That is, companies are creating a new generation of artificial intelligence toys whose makers share the aspiration to persuade children that their toys are alive, or, at any rate, are something more than inanimate.

A study has shown that a belief that a doll to be alive can create health risks for a user. The penchant to anthropomorphize (e.g., to believe that inanimate objects are to some degree humanlike and alive) is in no way restricted to the young, but children, who often favor magical thinking over the mundane rules of reality, have an especially rich capacity to believe in the unreal.

That is, the inventors have identified at least one technical problem of many technical problems in the conventional doll technology in that the doll technologies can appear life-like to a user such that it can be unhealthy for the user who may not attempt to socialize other than using the doll.

SUMMARY

In an exemplary embodiment, the present invention can provide a pseudo-sentient doll override system for a doll, the system including an interaction level determining circuit configured to determine an interaction level between a user and the doll, and a reminder triggering circuit configured to trigger a reminder to the user that the doll is not sentient based on the interaction level associated with a set of rules.

Further, in another exemplary embodiment, the present invention can provide a pseudo-sentient doll override method for a doll, the method including determining an interaction level between a user and the doll, and triggering a reminder to the user that the doll is not sentient based on the interaction level associated with a set of rules.

Even further, in another exemplary embodiment, the present invention can provide a non-transitory computer-readable recording medium recording a pseudo-sentient doll override program, the program causing a computer to perform: determining an interaction level between a user and the doll, and triggering a reminder to the user that the doll is not sentient based on the interaction level associated with a set of rules.

There has thus been outlined, rather broadly, an embodiment of the invention in order that the detailed description thereof herein may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

DETAILED DESCRIPTION OF THE EXEMPLARY EMBODIMENTS

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity. Exemplary embodiments are provided below for illustration purposes and do not limit the claims.

Figure 1:
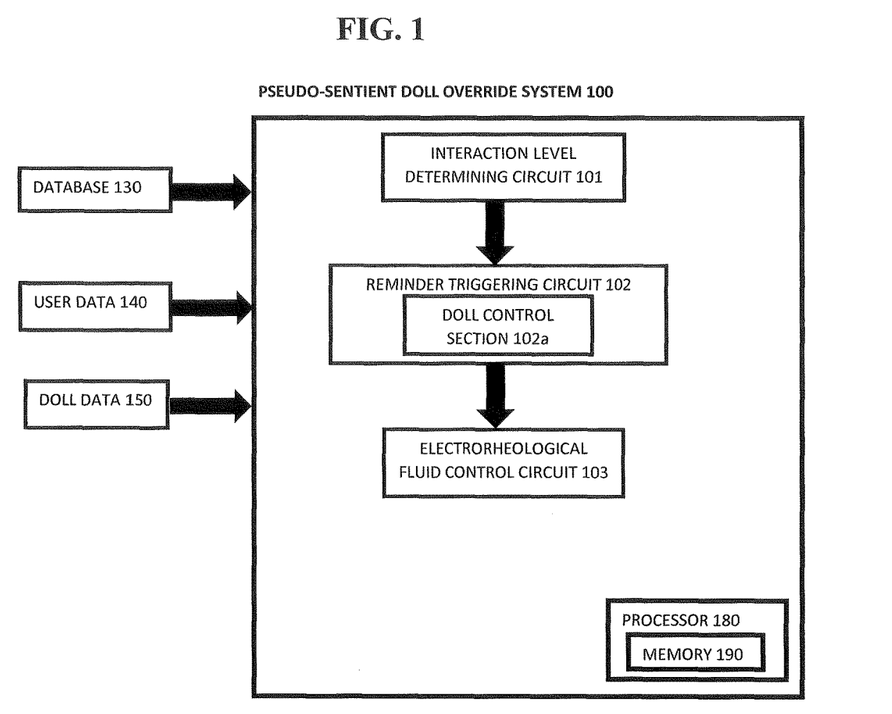
FIG. 1 exemplarily shows a block diagram illustrating a configuration of a pseudo-sentient doll override system 100.

With reference now to FIG. 1, the pseudo-sentient doll override system 100 includes an interaction level determining circuit 101, a reminder triggering circuit 102 having a doll control section 102a, and an electrorheological fluid control circuit 103. The pseudo-sentient doll override system 100 includes a processor 180 and a memory 190, with the memory 190 storing instructions to cause the processor 180 to execute each circuit of pseudo-sentient doll override system 100. The processor and memory may be physical hardware components, or a combination of hardware and software components.

Although the pseudo-sentient doll override system 100 includes various circuits, it should be noted that a pseudo-sentient doll override system can include modules in which the memory 190 stores instructions to cause the processor 180 to execute each module of pseudo-sentient doll override system 100.

Also, each circuit can be a stand-alone device, unit, module, etc. that can be interconnected to cooperatively produce a transformation to a result.

With the use of these various circuits, the pseudo-sentient doll override system 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 3:
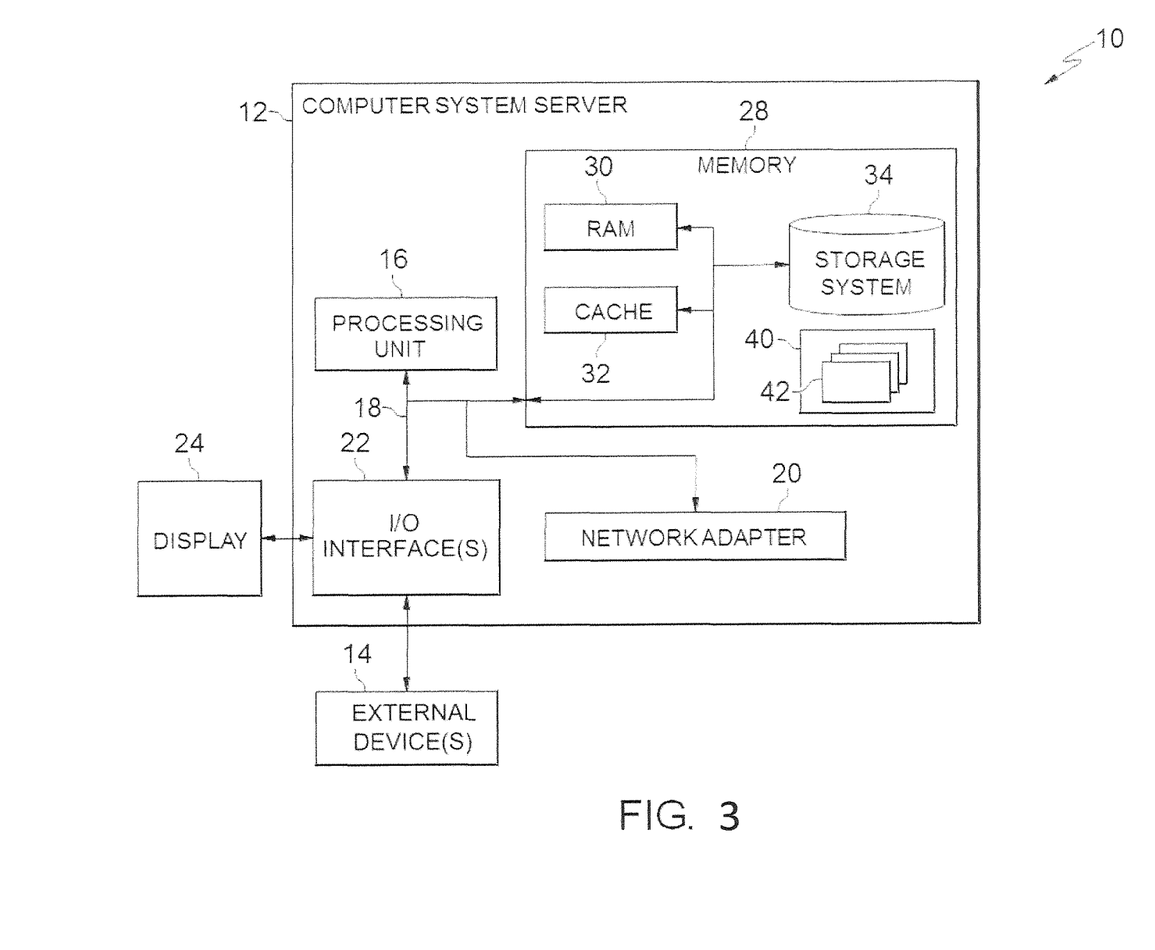
FIG. 3 depicts a cloud computing node 10 according to an exemplary embodiment of the present invention.
Figure 4:
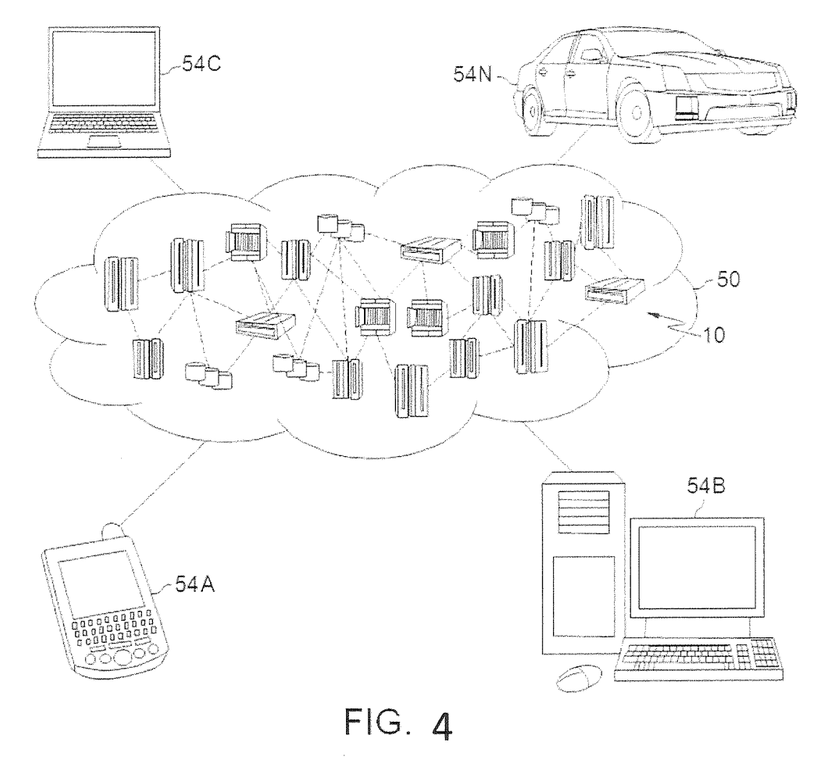
FIG. 4 depicts a cloud computing environment 50 according to another exemplary embodiment of the present invention.
Figure 5:
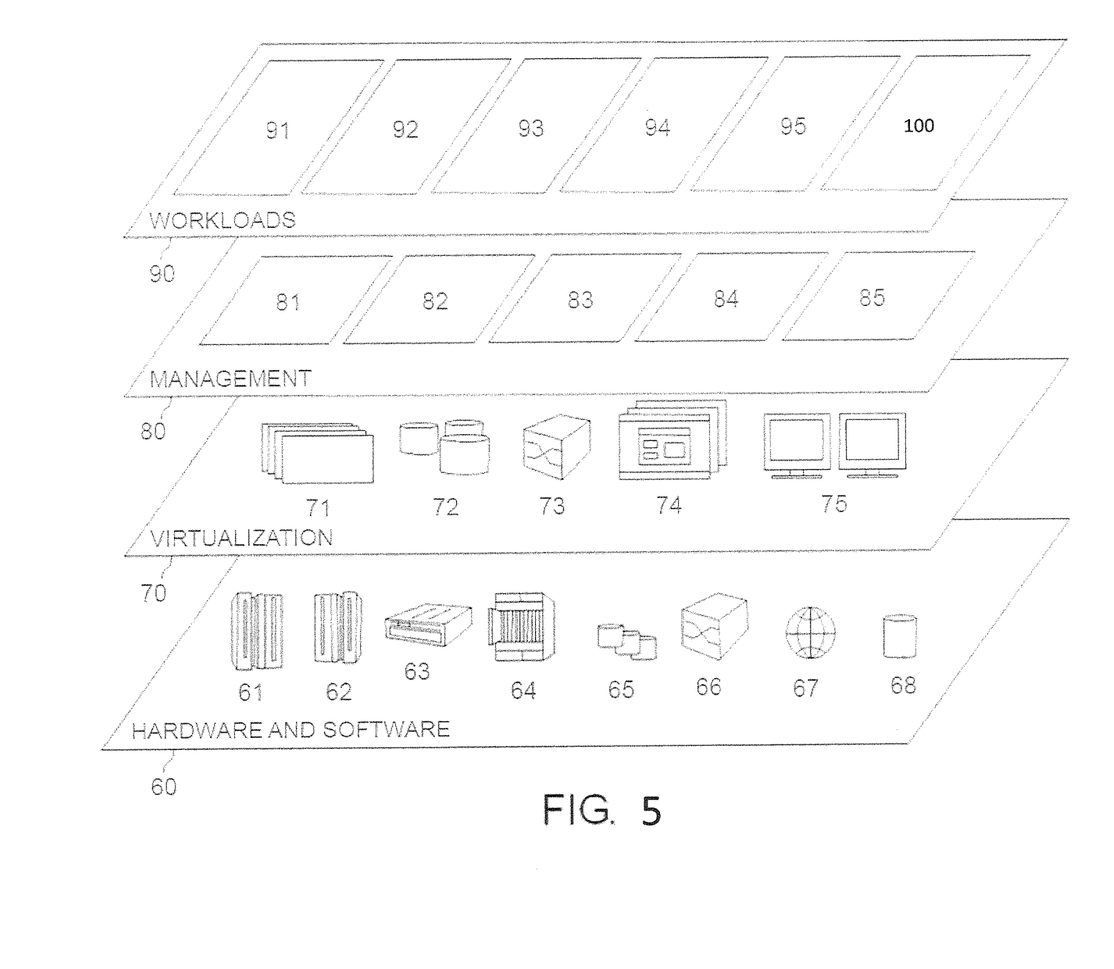
FIG. 5 depicts abstraction model layers according to an exemplary embodiment of the present invention.

Although as shown in FIGS. 3-5 and as described later, the computer system/server 12 is exemplarily shown as one or more cloud computing nodes 10 of the cloud environment 50 as a general-purpose computing circuit which may execute in a layer the pseudo-sentient doll override system 100 (FIG. 4), it is noted that the present invention can be implemented outside of the cloud environment.

The interaction level determining circuit 101 determines an interaction level between a user and a doll.

The doll includes artificial intelligence (AI) characteristics such that the doll interacts based on user commands, touch, motion of the user etc. That is, the AI characteristics of the doll can include natural language processing, responsiveness to touch, smart motion of the doll's lips, facial recognition, etc.

The interaction level between the doll and the user is based on behavior of the user towards the doll indicating that the user is "too engaged" with the doll such that it is likely that the user believes the doll is sentient or that the user is becoming too engaged or attached and needs a break from the doll to interact with other aspects of the environment.

The interaction level determining circuit 101 can determine the interaction level based on one or more user characteristics (e.g., user data 140) as part of criteria for triggering a reminder (as described later), such as user speech, gestures, amount of eye contact, facial expression, etc. Also, the interaction level can be determined based on biometrics, including EEG signals and also the kinds of input one might capture with, for example, a hexoskin biometric shirt. These captured inputs include, for example, heart rate, heart rate variability, breathing rate, breathing volume, activity (steps, walking cadence), sleep characteristics, etc.

The interaction level can be based on a cognitive state of the user related to an emotional assessment of the user to determine if the user is too engaged with the doll. Face-tracking technology can be utilized by the interaction level determining circuit 101 to determine a mood of the user and associate an interaction level with the doll based on rules in the database 130 (e.g., facial expression to interaction level relationships).

The user data 140 used by the interaction level determining circuit 101 to determine the interaction level between the doll and the user can also be detected by, for example, an electro-dermal sensor or the like that can be used to measure interest and/or excitement or over-engagement of a user while playing with a particular doll, which is then used to determine the interaction level of the user.

The user data 140 can also include assessed social development skills by measuring stress levels of users while playing social games, using body-worn sensors for measuring respiration and heart rate.

The user data 140 can also include non-verbal behavior of the user detected by so called "computer-vision" technology in order to identify behavior disorders such as autism and monitor other diseases so as to better determine the interaction level based on a background of the user (e.g., a user with a particular disease may be more engaged with the doll when exhibiting the same behavior as a user without the particular disease).

A combination of the inputs to determine the interaction level can be used to determine the interaction level by fusing multiple emotional predictors from different modalities.

The reminder triggering circuit 102 triggers a reminder to the user that the doll is not sentient based on the interaction level associated to a set of rules. The term "not sentient" is not limited merely "able to perceive or feel things" but more generally to the feeling that the doll is "alive" or a real human. That is, the reminder is for causing the user to understand that the doll is a doll and not alive.

The reminder comprises, for example, an audio output such as the doll saying "I am not alive" (e.g., possibly in a robotic or nonhuman voice since it can useful to capture that the voice characteristics may change (such as the pitch, prosody, formant structure, cadence, and the like)), a gestural output such as the doll entering a mode in which movements of limbs are jerky or the gait may become robotic, a visual output such as a changing of a color or a shape of the doll, a cessation of audio (e.g. going quiet for 5 minutes), or a cessation of movement. That is, the reminder triggering circuit 102 can include a doll control section 102a to control the doll to perform the reminder.

The type of reminder can also depend on the capabilities of the doll determined by the doll data 150 (e.g., whether the doll can output audio etc.).

That is, the interaction level is associated with the set of rules stored in the database 130 to determine when to trigger the reminder. For example, a rule can comprise a time based trigger such that when the interaction level exceeds a predetermined amount, the reminder is triggered at a given interval (e.g., every 5 minutes) until the interaction level is less than the predetermined amount.

In one embodiment, a rule can comprise a type of emotional expression such that if the interaction level is based on the type of emotional expression, the reminder is triggered.

It is noted that although the triggering is associated with the interaction level and the set of rules, the set of rules can include a mandatory override if the doll has an age requirement and the user does not meet the age requirement.

The reminder triggering circuit 102 can also learn which reminders (or triggers) are effective through time to indicate that user is too engaged or needs a break. In other words, the set of rules to initiate the reminder can be adjusted based on the reminder triggering circuit 102 learning the user's response. For example, the reminder triggering circuit 102 learns an effectiveness of the reminder based on the interaction level of the user after the reminder has been triggered (e.g., whether the user immediately return to believing that the doll is sentient or whether the user take time to return to the interaction level that causes the reminder).

A rule of the set of rules can also include a reminder to cause the doll to become rigid or hard so as to not seem sentient. Based on the reminder triggering circuit 102 triggering the reminder to cause the doll to become rigid, the electrorheological fluid control circuit 103 controls an electrorheological fluid in the doll such that the doll becomes rigid. The apparent viscosity of the electrorheological fluids changes reversibly by an order of up to 100,000 in response to an electric field. For example, a typical electrorheological fluid can go from the consistency of a liquid to that of a gel, and back, with response times on the order of milliseconds. It is noted that fluid need only be confined to a layer near the surface of the doll, (e.g. beneath the skin of the doll). In other words, the doll need not be completely filled with it.

The fluid can further comprise a magnetorheological fluid (MR fluid) which is a type of smart fluid in a carrier fluid, such as a type of oil. When subjected to a magnetic field, the fluid greatly increases its apparent viscosity, to the point of becoming a viscoelastic solid.

Figure 2:
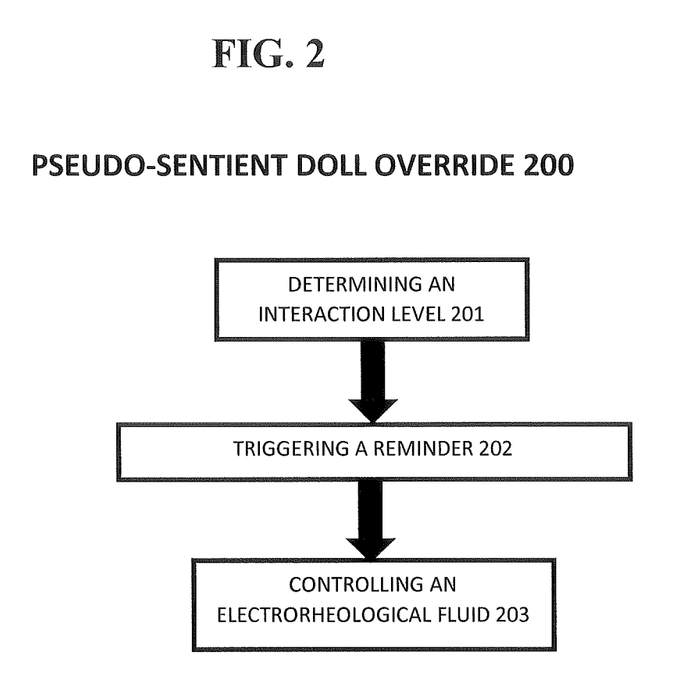
FIG. 2 exemplarily shows a high level flow chart for a pseudo-sentient doll override method 200.

FIG. 2 shows a high level flow chart for a method 200 of pseudo-sentient doll override.

Step 201 determines an interaction level between a user and a doll.

Step 202 triggers a reminder to the user that the doll is not sentient based on the interaction level associated to a set of rules.

Step 203 controls an electrorheological fluid in the doll such that the doll becomes rigid.

In one embodiment, an articulated and animated doll capable of recognizing human users and interacting with them is being played with by a user. The interaction level determining circuit 101 may use face recognition, fingerprint recognition, speech recognition, etc. to determine the interaction level of the user with the doll. The doll can include software for recognizing speech, generating speech and controlling animation of the articulated doll (e.g., the reminder triggering circuit 102). In addition, the reminder triggering circuit 102 can learn and store information pertaining to each human user such as name, age, sex, favorite color, etc. in the database 130, and to interact with each user on an individual basis, providing entertainment tailored specifically to each user.

The doll can be configured to respond with spoken words and/or sentences to the touching of selected portions of the doll by a user and/or voice actuation. Specific areas of the doll, such as eyes, ears, nose, etc. can be provided with touch switches. This response to touch can be disabled by the doll control section 102a of the reminder triggering circuit 102 at times to facilitate "pseudo-sentient doll override" based on the interaction level associated with a set of rules. In order to conserve power, a gravity switch may be provided to turn the doll on when the doll is placed in a sitting position or otherwise moved. If the doll is not moved, or receives no touch or voice stimulation after three minutes, the power may be turned off.

The set of rules can include a rule based on the situation between the doll and the user being inappropriate as determined by the interaction level determining circuit 101, or for any other reason, it can take a measure and stop responding to any of the external inputs or stimuli. For example, it may optionally stop responding to any question. The human (e.g., child) may perceive that the doll is no longer "alive". To avoid the confusion of whether the doll is actually broken, it can have an indicator light (or some other forms of indicator) to show that it went into the non-responding (hibernation) mode.

In another embodiment, the reminder triggering circuit 102 can learn and remember one or more interactions with the user. For example, in addition to remembering the user's name and age, and recognizing the user's face, the reminder triggering circuit 102 can remember segments of its interaction and give comments like "remember, we talked about this" or similar phrases referring to their prior play sessions.

In another embodiment, the play session history is not used, in order to make the doll less human like, so that a user can repeat the same play script many times without any sign of memory from the doll.

The system 100 and database 130 can be configured to receive the trigger reminders and interaction levels from each individual doll to user interaction such that the system 100 can benefit from aggregated data across multiple users. For example, some models of dolls are configured with internet-enabled software to decide a response to a user based on the user's interaction being checked against an online database. That is, based on the analysis of how a plurality of users responded to the "override" measures that the reminder triggering circuit 102 chose, the database 130 and system 100 can learn over time which measures of "pseudo-sentient doll override" have been most effective. The analysis can also take into account sex, age, regions, etc. of the users. The database 130 keeps a knowledge base for possible override measures and their effectiveness. This knowledge base can be used to choose an appropriate override measure for each individual user. It is noted that the database 130 and system 100 can aggregate data across multiple users or learn over time for the one user using the particular doll.

The database 130 can be installed on-board the doll.

Although the invention has been described with regard to dolls for children, the invention is not limited thereto and can include robots and androids that can be used to help the elderly.

Thereby, the method 100 may provide an exemplary technical solution to at least one technical problem by determining an interaction level between the doll and the user and triggering a reminder to the user that the doll is not sentient based on the interaction level and a set of predetermined rules thereby reducing health risks associated with the belief that the doll is sentient.

Exemplary Hardware Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

As shown in FIG. 3, computer system/server 12 in cloud computing node 10 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the pseudo-sentient doll override system 100 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A pseudo-sentient doll override system for a doll, the system comprising:
    an interaction level determining circuit configured to determine an interaction level between a user and the doll and determine whether the interaction level corresponds to the doll being sentient;
    a reminder triggering circuit configured to trigger a reminder to the user that the doll is not sentient based on the interaction level associated with a set of rules; and
    an electrorheological fluid control circuit, wherein said reminder comprises using said fluid control circuit to control an electrorheological fluid in the doll such that the doll becomes rigid.

2. The system of claim 1, wherein the interaction level between the user and the doll is based on behavior of the user towards the doll indicating that an engagement level of the user is with the doll greater than a predetermined engagement level such that the user believes the doll is sentient.

3. The system of claim 1, wherein the doll comprises artificial intelligence characteristics.

4. The system of claim 3, wherein the artificial intelligence characteristics include at least one of natural language processing, a responsiveness to touch, facial recognition, and a motion of lips of the doll.

5. The system of claim 3, wherein the reminder comprises disabling the artificial intelligence characteristics of the doll.

6. The system of claim 1, wherein the reminder further comprises at least one of:
    an audio output;
    a gestural output;
    a visual output;
    a cessation of audio; and
    a cessation of movement.

7. The system of claim 6, wherein the reminder triggering circuit includes a doll control section configured to control the doll to perform the reminder to reduce separation anxiety of the user to the doll by reminding the user that the doll is not sentient.

8. The system of claim 1, wherein the reminder triggering circuit includes a doll control section configured to control the doll to perform the reminder.

9. The system of claim 1, wherein the set of rules comprises a rule to trigger the reminder at a predetermined temporal interval, said rule selected from a group consisting of:
    a predetermined temporal interval; and
    a determination that the interaction level of the user is greater than a predetermined threshold.

10. The system of claim 1, wherein the set of rules comprises a rule to trigger the reminder when the interaction level of the user is greater than a predetermined threshold.

11. The system of claim 1, embodied in a cloud-computing environment.

12. The system of claim 1, wherein the interaction level determining circuit determines the interaction level based on at least one of:
    a speech of the user;
    a gesture of the user;
    an amount of eye contact between the user and the doll;
    a facial expression of the user;
    a cognitive state of the user; and
    user data detected by an electro-dermal sensor.

13. The system of claim 1, wherein the reminder includes erasing a memory of the doll such that a prior interaction between the doll and the user are repeated.

14. A pseudo-sentient doll override method for a doll including an electrorheological fluid, the method comprising:
    determining an interaction level between a user and the doll and whether the interaction level corresponds to the doll being sentient;
    triggering a reminder to the user that the doll is not sentient based on the interaction level associated with a set of rules; and
    wherein said reminder comprises controlling the electrorheological fluid in the doll such that the doll becomes rigid.

15. The method of claim 14, wherein the interaction level between the user and the doll is based on behavior of the user towards the doll indicating that an engagement level of the user with the doll is greater than a predetermined engagement level such that the user believes the doll is sentient.

16. The method of claim 14, wherein the doll comprises artificial intelligence characteristics.

17. The method of claim 14, wherein the reminder further comprises at least one of:
    an audio output;
    a gestural output;
    a visual output;
    a cessation of audio; and
    a cessation of movement.

18. The method of claim 14, wherein the triggering causes the doll to perform the reminder.

19. A non-transitory computer-readable recording medium recording a pseudo-sentient doll override program, the program causing a computer to perform:
    determining an interaction level between a user and the doll and whether the interaction level corresponds the doll being sentient;
    triggering a reminder to the user that the doll is not sentient based on the interaction level associated with a set of rules; and
    controlling an electrorheological fluid in the doll such that the doll becomes rigid as the reminder.

* * * * *

UNITED STATES PATENT AND TRADEMARK OFFICE
CERTIFICATE OF CORRECTION

PATENT NO.         : 10,441,892 B2  
APPLICATION NO.    : 15/222837  
DATED              : October 15, 2019  
INVENTOR(S)        : Minkyong Kim et al.

Page 1 of 1

It is certified that error appears in the above-identified patent and that said Letters Patent is hereby corrected as shown below:

On the Title Page

(54) Should read:
(54) ARTIFICIAL INTELLIGENCE TOY

Signed and Sealed this  
Thirty-first Day of December, 2019

Andrei Iancu  
*Director of the United States Patent and Trademark Office*